US008231305B2

(12) United States Patent
Lundy

(10) Patent No.: US 8,231,305 B2
(45) Date of Patent: Jul. 31, 2012

(54) REMEDIATION OF CONTAMINANTS FROM IN-SITU AND EX-SITU MEDIA

(76) Inventor: William L. Lundy, Oak Forest, IL (US)

( * ) Notice: Subject to any disclaimer, the term of this patent is extended or adjusted under 35 U.S.C. 154(b) by 439 days.

(21) Appl. No.: 12/240,460

(22) Filed: Sep. 29, 2008

(65) Prior Publication Data

US 2009/0087265 A1    Apr. 2, 2009

Related U.S. Application Data

(60) Provisional application No. 60/976,081, filed on Sep. 28, 2007.

(51) Int. Cl.
*B09C 1/00* (2006.01)
(52) U.S. Cl. .................................... 405/128.75
(58) Field of Classification Search ............ 405/128.75, 405/128.15, 128.2, 128.25, 128.45, 128.5
See application file for complete search history.

(56) References Cited

U.S. PATENT DOCUMENTS

| | | | |
|---|---|---|---|
| 5,018,576 A | 5/1991 | Udell et al. | |
| 5,415,777 A | 5/1995 | Krempen et al. | |
| 5,449,251 A | 9/1995 | Daily et al. | |
| 5,587,324 A | 12/1996 | Roy et al. | |
| 5,615,974 A * | 4/1997 | Land et al. | 405/128.35 |
| 5,621,845 A | 4/1997 | Bridges et al. | |
| 5,653,288 A | 8/1997 | Billings et al. | |
| 5,709,505 A | 1/1998 | Williams et al. | |
| 5,789,649 A | 8/1998 | Batchelor et al. | |
| 5,879,107 A * | 3/1999 | Kiest et al. | 405/128.5 |
| 5,976,348 A | 11/1999 | Pugh | |
| 6,158,924 A | 12/2000 | Athens et al. | |
| 6,356,830 B1 * | 3/2002 | Adamchuck et al. | 701/50 |
| 6,387,278 B1 | 5/2002 | Leif et al. | |
| 6,623,211 B2 * | 9/2003 | Kukor et al. | 405/128.75 |
| 6,843,618 B2 * | 1/2005 | Lundy | 405/128.75 |
| 6,913,419 B2 | 7/2005 | Shiau | |
| 2004/0197150 A1 * | 10/2004 | Bruell et al. | 405/128.5 |
| 2007/0116524 A1 | 5/2007 | Shiau | |

OTHER PUBLICATIONS

Guy D. Smith, Roy W. Simonson, Guy D. Smith, Walter H. Gardner, Goro Uehara, G. A. Peterson, W. O. Willis, C. W. Robbins, C. W. Robbins, Michael Shannon, John E. Gilley, Donald Fryrear, "Soil," in AccessScience, © McGraw-Hill Companies, 2008, http://www.accessscience.com.*
Laurier L. Schramm, "Emulsion," in AccessScience, © McGraw-Hill Companies, 2008, http://www.accessscience.com.*
Zhang, W. et al., (2006). Pretreatment of Coal Gasification Wastewater by Acidification Demulsion. Chinese Journal of Chemical Engineering, vol. 14, Issue 3, 398-401.
Ndjou'ou, A. & Cassidy, D. (2006). Surfactant Production Accompanying the Modified Fenton Oxidation of Hydrocarbons in Soil. Chemosphere, vol. 65, Issue 9, 1610-1615.

\* cited by examiner

*Primary Examiner* — John Kreck
(74) *Attorney, Agent, or Firm* — Greenberg Traurig, LLP

(57) ABSTRACT

Described herein is technology for, among other things, a composition for emulsifying a contaminant ground media, where the ground media includes an iron compound. The composition includes a peroxide, a water-soluble aminopolycarboxylate chelating agent, and an amount of a buffering agent sufficient to adjust a pH of a mass of the contaminant to between 7.0 and 9.0 when the buffering agent mixes with the contaminant.

28 Claims, No Drawings

REMEDIATION OF CONTAMINANTS FROM IN-SITU AND EX-SITU MEDIA

CLAIM OF PRIORITY UNDER 35 U.S.C. §119

The present Application for Patent claims priority to Provisional Application No. 60/976,081 entitled "Emulsification and Remediation of Coal Tar and Heavy Hydrocarbons" filed Sep. 28, 2007, and hereby expressly incorporated by reference herein.

BACKGROUND

In the remedial marketplace, there is a problem with sites that are contaminated with certain materials.

Coal tar in particular has been generated over the years from various manufactured gas plants (MGP) around the country. The manufactured gas of these plants was produced by burning coal, which produced methane (coal gas). Coal tar, which was one of the byproducts generated by these plants, had little or no market value. Consequently, much of the coal tar was disposed on-site, either down wells or in gas holders in the plants, or shipped off-site and landfilled.

At ambient underground water temperatures, coal tar is a very thick and a viscous substance and therefore is not easily mobilized. Consequently, prior efforts to remove coal tar from soil has largely centered upon excavation. For example, one previous method adds acid to the soil, which solidifies the coal tar so it can be excavated as a solid. Another method mixes coal or wood with the coal tar prior to excavation.

Alternatively, the coal tar may be mobilized by thermal remediation. These methods are very costly and require the placement of in-situ electrodes or excavation followed by thermal desorption. In addition, the heating of the coal tar leads to the release of several volatile byproducts such as benzene, toluene, ethyl benzene, and xylenes (BTEX), and semi-volatile byproducts such as creosote and polyaromatic hydrocarbons, including benzo(a)pyrene (a known carcinogen).

Other known removal techniques, such as enzyme action and vacuum extraction, which have been successful in remediating other soil contaminants, are ineffective in the removal of heavy hydrocarbons and coal tar due to their high viscosity. Still other methods promote using surfactant flushing in combination with vacuum extraction. Although these methods can mobilize coal tar and heavy hydrocarbons, they require the injection of one or more surfactants as amendment compounds in combination with the oxidizers.

Methods of decontaminating soil and groundwater containing certain organic contaminants are disclosed in U.S. Pat. No. 6,843,618, entitled "IN SITU SUBSURFACE DECONTAMINATION METHOD," invented by the inventor hereof, and incorporated by reference herein. However, the methods so disclosed are not able to efficiently remediate and emulsify coal tar and heavy hydrocarbons.

Thus, conventional technology has not provided a successful and cost-effective means by which to remediate coal tar and heavy hydrocarbons.

In addition to the above-referenced problems with sites that are contaminated with coal tar and heavy hydrocarbons, conventional remediation methodologies are also ineffective at removing contaminants in general from sediment. Numerous MGP sites are located in low-lying areas where sediments make up a significant mass of the geologic formation. These sediments present a major obstacle to nearly all in-situ chemical oxidation processes because of the extraordinarily high percentage of natural organic matter (NOM). This material is composed primarily of cellulose from decayed plants. This organic matter presents an unusually high matrix oxidizer demand (MOD) in comparison to soils composed primarily of inorganic minerals. Therefore, conventional oxidizers such as the Fenton's hydroxyl radical mechanism or persulfate systems, which are widely known for their highly reactive oxidation potentials, are inefficient in remediating contaminants located in sediment formations. The oxidation potential of these entities is such that they react with the sediments and contaminants equally well. Thus, they are indiscriminate in selecting contaminants from sediment.

Thus, conventional technology has not provided a successful and cost-effective means by which to remediate contaminants in general from sediment.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, a composition for emulsifying a contaminant in ground media, where the ground media includes an iron compound. The composition includes a peroxide, a water-soluble aminopolycarboxylate chelating agent, and an amount of a buffering agent sufficient to adjust a pH of a mass of the contaminant to between 7.0 and 9.0 when the buffering agent mixes with the contaminant.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

Generally speaking, embodiments provide for methods and chemical mixtures for emulsifying and remediating contaminants from a ground media. In particular, embodiments provide for methods and chemical mixtures for emulsifying and remediating heavy hydrocarbons and coal tar. As used herein and in the claims, a "heavy hydrocarbon" shall be defined as a hydrocarbon having an American Petroleum Institute gravity, or API gravity, of less than 10. Examples of such heavy hydrocarbons may include, but are not limited to, crude oil, bunker C oil, No. 4 oils, No. 5 oils, and No. 6 oils. Embodiments also provide for methods and chemical mixtures for emulsifying and remediating contaminants from sediment.

Using an appropriate mixture according to an embodiment, contaminants—and in particular heavy hydrocarbons and coal tar—may be emulsified and mobilized, thereby enabling the extraction thereof. Although embodiments may be described hereinbelow with reference to either coal tar or heavy hydrocarbons, it will be understood that such embodiments are equally applicable to both, as well as to other contaminants such as inter alia, aliphatic hydrocarbons, such as gasoline, diesel fuel, olefinic hydrocarbons, chlorinated and polychlorinated hydrocarbons, dry cleaning and industrial solvents, wood treating agents, herbicides, pesticides, polychlorinated biphenyls, and aromatic and polynucleararomatic hydrocarbons, oxygenated hydrocarbons, phenol and phenol derivatives, nitrogenous hydrocarbons, or mixtures thereof.

Fundamental to the success of various embodiments of the present invention for the removal of coal tar is the understanding that because coal tar contains creosote, creosote derivatives, aldehydes and other hydroxyorganic compounds generated by the pyrolytic destruction of coal in the manufacture of coal gas, the pH of the contaminants is usually found to be acidic (i.e. less than 7). Similarly, heavy hydrocarbons, particularly when present in a chemically or biologically reducing environment, are stabilized by acidic pH conditions. Buffering the pH to a basic condition (i.e. greater than 7) during the oxidation process increases the solubility of the hydrocarbon thereby, creating the conditions conducive to emulsification. It should be appreciated that in the acidic state, organic compounds exhibiting organic acid characteristics are quite insoluble. However, when the pH is raised to the alkaline range (i.e. greater than 7), the solubility of these compounds generally increases dramatically. This physicochemical change contributes to the desorption of the contaminant by increasing its solubility in the aqueous media, thus allowing it to reside in increased concentrations in the aqueous phase. This increased solubility exposes the contaminant to the oxidizing reagent, thereby allowing the oxidation reaction to occur. Thus, in one embodiment, the coal tar is treated in order to adjust the pH of the contaminant mass to the alkaline pH range—preferably between pH 7 and 9. This aids in preparing the coal tar for chemical oxidation by increasing its solubility.

In the special case of remediating contaminants in sediment, both the Fenton hydroxyl radical and the persulfate radical mechanisms are such active oxidizers that both the contaminants and the sediment matrix are indiscriminately attacked. Fundamental to the success of various embodiments of the present invention in the remediation of contaminants in sediments is the understanding that when a chelating agent is used to activate intrinsic iron compounds in the soil matrix, the predominant iron cation produced by this chelate reaction is the ferric ($Fe^{+3}$) cation. When reacted with hydrogen peroxide, the predominant radical produced is the perhydroxyl radical $[OOH]°$. This radical possesses approximately one half the oxidation potential of the Fenton hydroxyl or persulfate radicals. This is significant because most of the sediment constituents are unreactive to the perhydroxyl radical. Thus, contaminants residing in sediments can be selectively targeted by the radicals generated under the mechanism of this invention, while little or no oxidizer is expended by reaction with the sediments.

The remediation process according to various embodiments involves an oxidation reaction whereby coal tar is chemically oxidized by reaction with hydrogen peroxide and metallic peroxides in the presence of a metal catalyst. The method includes harnessing the abundance of metals in ground media as a source of the metal catalysts. The method may involve at least one or more injection sites, whereby an aqueous reagent fluid is injected into the subsurface to facilitate the oxidation of contaminants. The in situ subsurface media affected may include the subsurface unsaturated zone, the capillary fringe above the groundwater table, and the water-saturated zone, including soil and groundwater in fractured bedrock.

In one embodiment, the pH level of a contaminant mass is determined. It should be appreciated that this may be achieved a number of ways. For example, the contaminant pH may be measured indirectly, by taking pH measurements of groundwater in monitoring wells. Alternatively, the pH may be directly measured by driving a probe rod into the contaminant mass and extracting, thereby obtaining a sample of the contaminant itself, and then checking the pH of the contaminant using conventional techniques. For coal tar, such pH readings typically fall in the range of 5-6.5.

Therefore, an embodiment involves adjusting the pH of the aqueous reagent accordingly to buffer the pH of the contaminant mass to between 7 and 9. In another embodiment, the target pH of the contaminant mass is between 7.5 and 8.5. In yet another embodiment, the target pH of the contaminant mass is approximately 8. Such buffering may be achieved, for example, by adding an appropriate amount of a basic buffering agent, such as potassium hydroxide (also known as caustic potash).

As mentioned above, various embodiments involve delivering an aqueous oxidizing reagent formulation in situ to contaminated subsurface media, soil and groundwater, or sediment. The formulation may include liquid and solid peroxides and phosphate salts, as well as sulfuric acid and its salts and aminopolycarboxylate chelates. The chelates in the reagent fluid extract naturally occurring metals from the ground media as a source of metal catalysts necessary to convert the peroxides to the oxidizing agents that ultimately convert the contaminants to environmentally safe and non-toxic compounds. The methodology of successfully compounding chelating agents into the oxidizer reagent formulation obviates the need for a second formulation containing the metal catalysts. Because various embodiments control the activity of the chelates and the oxidizers, the rate of the oxidation reaction is controlled, thereby minimizing or eliminating the temperature rise produced by conventional technologies. Also, various embodiments minimize any increase in the temperature of the groundwater and/or soil moisture, and the volatilization of contaminants in the in situ proximity of the oxidation reaction is also minimized.

The peroxides that may be administered to the subsurface media in an aqueous fluid include, but are not limited to, hydrogen peroxide, magnesium peroxide, calcium peroxide, and sodium percarbonate. The aqueous solution of the peroxide and a water-soluble chelating agent, when adjusted to achieve the pH levels described, often requires the presence of an alkaline buffering agent (separate from the buffering agent used to adjust the pH of the contaminant mass). This buffering agent is desirably a water-soluble phosphate and, in various embodiments, may be selected from the alkali metal phosphates (potassium phosphate being exemplary), ammonium phosphate, urea phosphate, and combinations thereof.

The preferred chelates are exemplified by the aminopolycarboxylate chelates ethylenediaminetetraacetic acid (EDTA), diethylenetriaminepentaacetic acid (DTPA), ethylenediamine-di(o-hydroxyphenylacetic acid) (EDDHA), their salts, and combinations thereof. In one embodiment, the chelate is preferably EDTA used in the acid form (quadrabasic acid), as opposed to the sodium or ammonium salt. In various embodiments the use of the quadrabasic acid form of EDTA employs the chelate as a buffer to counter the production of calcium hydroxide, a byproduct of the reaction of calcium peroxide with water used to produce hydrogen peroxide. Significantly, this reaction is responsible for the activation of the EDTA by increasing the pH of the solution, thereby contributing to the dissolution of EDTA and bringing it into solution.

Phosphates, as well as sulfuric acid and its salts, are used to adjust the pH and to inhibit decomposition of hydrogen peroxide by free iron or other divalent metals, such as copper in the aqueous reagent fluid.

The method of various embodiments utilizes the hydrogen peroxide liberated by the dissolution of solid peroxides including calcium peroxide, magnesium peroxide, and sodium percarbonate. The preferred solid calcium and magnesium peroxide employed by various embodiments react with water according to the following reactions:

$$CaO_2 + 2H_2O \rightarrow Ca(OH)_2 + H_2O_2 \quad (1)$$

$$MgO_2 + 2H_2O \rightarrow Mg(OH)_2 + H_2O_2 \quad (2)$$

$$Ca(OH)_2 \rightarrow Ca_2 + 2OH^- \quad (3)$$

$$Mg(OH)_2 \rightarrow Mg_2 + 2OH^- \quad (4)$$

The hydrogen peroxide that is gradually liberated in reactions (1) and (2) is available for catalytic decomposition. The hydroxides resulting from reactions (1) and (2) dissociate reactions (3) and (4), thereby raising the pH of the solution. The phosphates added to the solution moderate the pH drift. The pH drifts to basic conditions. Basic pHs facilitate the dissolution of suspended EDTA, DTPA, and EDDHA solids.

Accordingly, as the contaminants are oxidized (hydroxylated) their solubility in an aqueous media increases. In this process, they are converted to alcohols, polyols, fatty (organic) acids, etc. This group of compounds is referred to as surface acting agents, or surfactants. Surfactants are compounds that carry insoluble compounds in water thus acting as a transport mechanism. As the contaminants are converted to alcohols, they become less recalcitrant and are readily biodegraded.

When the oxidizing reagents react with organics, a certain quantity are mineralized, thereby producing carbon dioxide gas. This gas produces a foam with the produced surfactants that raises to the surface of the ground to signal the presence of organic contaminants. The produced gas also opens the pore space in the soil, thereby facilitating the penetration of the reagent further into the contaminated media. The reaction gas also facilitates the mixing of the reagent with the contaminant thus increasing the contact between the two entities. It should be appreciated that increased mixing (contact) increases the probability of molecular contact.

Significantly, various embodiments are able to produce all of the needed surfactants from the conversion of the contaminants to surfactants. Therefore, any would-be need for the addition of introduced surfactants is obviated when employing this technology to remediate contaminants. This simplifies both the formulation compounding as well as the injection process.

When contaminant concentrations are so high that the contaminant is present as free product (such as the mass found in gas holders), a preferred method of remediation involves emulsifying the contaminant (by injecting the reagent through one or more injection points) and subsequently extraction the contaminant, for example, by pumping the contaminant (e.g. via vacuum pumping) out of the formation by one or more extraction wells that will remove the bulk of the contaminant to the point where the remaining contaminant can be mitigated by oxidation alone.

The Chelating Agents

The synthetic chelating agents employed in the present invention are the aminopolycarboxylatechelates EDTA, DTPA, and EDDHA. These agents form soluble complexes and chelates with free metal ions, such as divalent iron Fe(II), trivalent iron Fe(III), divalent copper Cu(II), divalent zinc Zn(II), divalent magnesium Mg(II) and divalent calcium Ca(II) in solution. The chelating agents dissociate exchangeable cations attached to mineral surfaces and also dissolve minerals. The iron-containing minerals that are dissolved by chelates include, inter alia, goethite, hematite, magnetite, ferrihydrite, and siderite.

The effective complexation of the iron catalyst is strongly dependent on solution pH and the presence of Ca(II) and, to a lesser degree, Mg(II) (water hardness), which typically occurs at higher concentrations than Fe in natural waters. The proportions of EDTA, DTPA, and EDDHA employed depend upon the water hardness and the leachability of Ca(II), Mg(II), and Fe(II)/Fe(III) from the media. Two solution conditions are known to decrease the stability of Fe-EDTA and FE-DTPA, i.e., their tendency to form soluble Fe-chelates. First, in basic solutions, the solubility of iron is controlled by amorphous ferric iron hydroxide, which precipitates and diminishes the stability of Fe-EDTA and Fe-DTPA complexes. Second, when Calcium is in high solution concentrations, it competes with iron for chelates Fe-DTPA, and moreso, Fe-EDDHA chelates are less affected by these solution conditions than Fe-EDTA chelates.

Various embodiments of the present invention utilize an oxidation reaction, where a chelated metal, preferably chelated iron, catalyzes the decomposition of hydrogen peroxide to yield hydroxyl, perhydroxyl, and superoxide radicals. As such, the reagent fluid should contain only an effective amount of metal catalyst (i.e., not an excessive amount of catalyst to cause an undesirable detectable increase in the decomposition rate of the peroxide for safety and stability reasons). The soluble Fe-EDTA, Fe-DTPA, and Fe-EDDHA chelates react with hydrogen peroxide to yield these highly reactive radicals, which, in turn, react with organic compounds. The rate of oxidation reaction with Fe(II)-aminocarboxylate complexes, including Fe(II)-EDTA, Fe(II)-DTPA, and Fe(II)-EDDHA complexes is greater by orders of magnitude than the rate of oxidation reaction with Fe-aquo complexes in solutions, with near-neutral pH. Fe(II) and Fe(III)-chelates are part of a cycle that decomposes hydrogen peroxide. Hydrogen peroxide oxidizes Fe(II)-chelate to Fe(III)-chelate and reduces Fe(III)-chelate to Fe(II)-chelate. The radicals that evolve from these oxidation and reduction reactions also oxidize the organic complexing agents.

In aqueous Fenton-type oxidation systems, aliphatic and aromatic compounds and their halogenated derivatives undergo hydroxylation followed by mineralization. Fenton-type oxidation systems have been used to enhance the biological treatability of wastewater and landfill leachate containing various toxic and recalcitrant organic compounds. Fenton-type oxidation systems in soil decompose organic contaminants and also enhance their biological degradation in soil.

Solution Concentration and Application to Media

In one embodiment, the reagent fluid is comprised of water; the peroxides hydrogen peroxide, calcium peroxide, magnesium peroxide and/or sodium percarbonate, preferably calcium peroxide, magnesium peroxide and/or sodium percarbonate; and the salts of potassium phosphate salts and urea phosphate, combinations thereof of the aminopolycarboxylate chelates ethylenediaminetetraacetic acid (EDTA), diethylenetriaminepentaacetic acid (DTPA), ethylenediamine-di (o-hydroxyphenylacetic acid) (EDDHA), and their salts and combinations thereof; and an appropriate amount of a buffering agent, such as potassium hydroxide, to adjust the pH of the contaminant mass to within the desired range, and are injected into soil and groundwater.

Typical molecular weights and Molar concentrations of example reagent components are illustrated in Table 1. However, it should be appreciated that concentrations other than those shown may be used—for example in cases involving extreme subsurface media conditions. The proportions of aminopolycarboxylate chelates are determined based on site-specific leachability of calcium, iron, and copper naturally occurring in the media, groundwater alkalinity, and soil pH. The concentration of the contaminant buffering agent (e.g., caustic potash) is determined based on the pH of either the groundwater or preferably the contaminant itself. Table 2 illustrates typical formulations of the aqueous reagent, in accordance with various embodiments, though embodiments are not limited as such. It will again be appreciated that these formulations are exemplary and that embodiments are not limited solely to such formulations.

TABLE 1

Typical molecular weights and Molar concentrations of the reagent components

| Element | At. Wt. | $H_2O_2$ | $CaO_2$ | EDTA | DAP | KOH | UP |
|---|---|---|---|---|---|---|---|
| H | 1 | 2 | | 16 | 9 | 1 | 7 |
| O | 16 | 32 | 32 | 128 | 64 | 16 | 80 |
| Ca | 40 | | 40 | | | | |
| N | 14 | | | 28 | 28 | | 28 |
| K | 39 | | | | | 39 | |
| P | 31 | | | | 31 | | 31 |
| C | 12 | | | 120 | | | 12 |
| Molecular Weight | | 34 | 72 | 292 | 132 | 56 | 158 |

| Formulated in one liter of water | | | | | | | | | | | Typical Molar |
|---|---|---|---|---|---|---|---|---|---|---|---|
| Percent | 1 | 2 | 3 | 4 | 5 | 6 | 7 | 8 | 9 | 10 | Concentrations as |
| weight | 10 | 20 | 30 | 40 | 50 | 60 | 70 | 80 | 90 | 100 | Applied Reagent |
| $H_2O_2$ | 0.29 | 0.59 | 0.88 | 1.18 | 1.47 | 1.76 | 2.06 | 2.35 | 2.65 | 2.94 | 0.15 to 2.95 |
| $CaO_2$ | 0.14 | 0.28 | 0.42 | 0.56 | 0.69 | 0.83 | 0.97 | 1.11 | 1.25 | 1.39 | 0.28 to 1.39 |
| EDTA | 0.03 | 0.07 | 0.10 | 0.14 | 0.17 | 0.21 | 0.24 | 0.27 | 0.31 | 0.34 | 0.07 to 0.34 |
| DAP | 0.08 | 0.15 | 0.23 | 0.30 | 0.38 | 0.45 | 0.53 | 0.61 | 0.68 | 0.76 | 0.15 to 0.76 |

KOH Used to adjust pH of injected reagent upward to 11 when necessary*
UP Used to adjust pH of inject reagent downward to 8 when necessary

TABLE 2

Formulations To Emulsify Coal Tar and Heavy Hydrocarbons
Typical formulations for the emulsification and oxidation of coal tar. All formulations are calculated on a weight/weight (weight of compound as a % of weight of water) basis.

| | Typical Formulas | | | |
|---|---|---|---|---|
| Compounds | 1 | 2 | 3 | 4 |
| Hydrogen Peroxide (as 100%) | 0.5% | 2% | 5% | 6% |
| Calcium Peroxide (CP) | 3% | 4% | 8% | 10% |
| EDTA** (as a % of CP) | 15-35 | Same | Same | Same |
| DiAmmomiumPhosphate (DAP) | 2-5% | 2-5% | 2-5% | 2-5% |
| KOH (Adjust pH up) | AN* | AN* | AN* | AN* |
| Urea Phosphate (Adjust pH down) | AN* | AN* | AN* | AN* |

*AN (as needed) to adjust pH of formation to 7.0 to 9.0
**EDTA is used in the acid form (quadrabasic acid) not the sodium or ammonium salt)

The method of this embodiment injects a single reagent fluid that contains all of the reagent compounds required for chemical oxidation of contaminants. At least one injection, but preferably a plurality of closely spaced injections, is performed within the contaminated subsurface media to increase the probability of contact between the reagent and the contaminant. The in situ environment wherein the fluid is administered may include, separately or in combination, soil and/or sediment in the groundwater unsaturated zone, the capillary fringe, soil and groundwater of the water saturated subsurface, and groundwater in the bedrock. A preferred embodiment treats subsets of the entire contaminated volume by administering small volumes of reagent fluid in a plurality of injection points. This application methodology allows the treatment of subsets with fluid volumes sufficient to wet the media.

The rate of the oxidation reactions is controlled by two mechanisms. First, because of the gradual dissolution of solid peroxides, the concentration of hydrogen peroxide in the subsurface media remains sufficiently low. Second, the dissolution of the peroxides increases the pH, which, in turn, leads to the dissolution of the acidic chelates required for the formation of the chelated iron catalyst. The combined effect of the two mechanisms minimizes or eliminates the evolution of excessive heat from oxidation reactions. As such, the temperature of the ground water/subsurface media typically rises no more than 10° F., preferably no more than 5° F., and most preferably no more than 1° F. The oxidation reactions cause mild off-gassing of carbon dioxide and oxygen. The off gassing observed during progressive injections may be utilized to delineate the vertical and horizontal extent of contamination in subsurface media and to make adjustments to the reagent fluid.

Thus, embodiments advantageously allow for the remediation and emulsification of contaminants—in particular coal tar and heavy hydrocarbons, which were previously removable only though excavation, solvent flushing and extraction, surfactant flushing and extraction, or thermal extraction. Moreover, embodiments do not require long-term operation, maintenance, and monitoring. In one embodiment, a single reagent fluid may be utilized instead of the multiple reagent fluids consistent with other conventional technologies. This greatly increases the ability of the reagents to penetrate the media and contact the coal tar or heavy hydrocarbons by controlling the rate at which the reagent generates the oxidizing component. Further, the application of a dilute aqueous reagent fluid greatly increases the safety of embodiments. Various embodiments further provide the ability to control the rate of the chemical reactions during treatment, thereby minimizing or eliminating the heat generated by conventional technologies, and thus assuring that contaminants are not volatilized during the treatment, which in turn suppresses odors at the site. Various embodiments also eliminate the need for pretreatment of the subsurface media with acid and/or a metal catalyst as is required by conventional methods. Furthermore, because the oxidization radicals produced by various embodiments possess roughly half the oxidization capacity of conventional oxidization radicals, such embodiments may advantageously be used to discriminately remediate contaminants from sediment, while note unnecessarily expending expensive treatments on the highly organic sediment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of decontaminating ground media containing a contaminant, the method comprising:
   treating ground media comprising an iron compound and organic sediment with an effective amount of aqueous solution comprising a peroxide, a water-soluble aminopolycarboxylate chelating agent, and an amount of a buffering agent sufficient to adjust a pH of a mass of the contaminant to between 7.0 and 9.0, for a time sufficient to have the chelating agent chelate the iron of the iron compound;
   reacting the chelated iron with the peroxide to catalytically convert the peroxide to an oxidizing agent;
   contacting the mass of the contaminant with the buffering agent to adjust the pH to between 7.0 and 9.0; and
   contacting the contaminant with the oxidizing agent to oxidize the contaminant.

2. The method as recited in claim 1 wherein the contaminant comprises coal tar.

3. The method as recited in claim 1 wherein the contaminant comprises a heavy hydrocarbon.

4. The method as recited in claim 1 wherein the contaminant includes a component that is selected from the group consisting of an aliphatic hydrocarbon, gasoline, diesel fuel, an olefinic hydrocarbon, a chlorinated hydrocarbon, a polychlorinated hydrocarbon, a dry cleaning solvent, an industrial solvents, a wood-treating agent, a herbicide, a pesticide, a polychlorinated bipbenyl, an aromatic hydrocarbon, a polynucleararomatic hydrocarbon, an oxygenated hydrocarbon, a phenol, a phenol derivative, and a nitrogenous hydrocarbon.

5. The method as recited in claim 1 wherein the ground media comprises soil and ground water.

6. The method as recited in claim 1 wherein the peroxide is selected from the group consisting of calcium peroxide and hydrogen peroxide.

7. The method as recited in claim 1 wherein the chelating agent comprises one or more of ethylenediaminetetraacetic acid (EDTA), diethylenetriaminepentaacetic acid (DTPA), and ethylenediamine-di(o-hydroxyphenylacetic acid) (EDDHA).

8. The method as recited in claim 1 wherein the buffering agent comprises one or more of an alkali metal phosphate, ammonium phosphate, urea phosphate, and potassium hydroxide.

9. The method as recited in claim 8 wherein the alkali metal phosphate comprises potassium phosphate.

10. The method as recited in claim 1 wherein the amount of the buffering agent is sufficient to adjust the pH of the mass of the contaminant to between 7.5 and 8.5.

11. The method as recited in claim 10 wherein the amount of the buffering agent is sufficient to adjust the pH of the mass of the contaminant to about 8.0.

12. The method as recited in claim 1, further comprising:
   emulsifying the contaminant; and
   extracting the emulsified contaminant.

13. The method as recited in claim 12 wherein extracting the emulsified contaminant comprises vacuum-pumping the contaminant.

14. The method as recited in claim 1 wherein contacting the contaminant with the oxidizing agent to oxidize the contaminant further comprises:
   contacting the contaminant with the oxidizing agent to oxidize the contaminant and to produce reaction gasses.

15. The method as recited in claim 14 further comprising:
   verifying the presence of the contaminant in the ground media based on the presence of the reaction gasses.

16. The method as recited in claim 14 wherein the reaction gasses comprise one or more of oxygen and carbon dioxide.

17. The method as recited in claim 1 wherein contacting the contaminant with the oxidizing agent to oxidize the contaminant further comprises:
   contacting the contaminant with the oxidizing agent to oxidize the contaminant and to produce surfactants and/or wetting agents;
   reacting the surfactants and/or wetting agents with the contaminant to emulsify the contaminant.

18. The method as recited in claim 1 further comprising:
   initially determining the pH of the mass of the contaminant.

19. The method as recited in claim 18, wherein determining the pH of the mass of the contaminant comprises:
   indirectly measuring the pH of the mass of the contaminant by measuring the pH of groundwater in monitoring wells.

20. The method as recited in claim 18, wherein determining the pH of the mass of the contaminant comprises:
   driving a probe rod into the mass of the contaminant;
   extracting a sample of the mass of the contaminant with the probe rod; and
   directly measuring the pH of the mass of the contaminant.

21. A method of decontaminating ground media containing contaminant, the method comprising:
   treating ground media comprising an iron compound and organic sediment with an effective amount of aqueous solution comprising a peroxide, a water-soluble aminopolycarboxylate chelating agent, and an amount of a buffering agent sufficient to adjust a pH of a mass of the contaminant to between 7.0 and 9.0, for a time sufficient to have the chelating agent chelate the iron of the iron compound, wherein the contaminant comprises coal tar or a heavy hydrocarbon;
   reacting the chelated iron with the peroxide to catalytically convert the peroxide to an oxidizing agent;
   contacting the mass of the contaminant with the buffering agent to adjust the pH to between 7.0 and 9.0; and
   contacting the contaminant with the oxidizing agent to oxidize the contaminant.

22. The method as recited in claim 21 wherein the ground media comprises soil and ground water.

23. A method of decontaminating organic sediment containing an iron compound and contaminant, the method comprising:

treating the organic sediment with an effective amount of aqueous solution comprising a peroxide, a water-soluble aminopolycarboxylate chelating agent, and an amount of a buffering agent sufficient to adjust a pH of a mass of the contaminant to between 7.0 and 9.0, for a time sufficient to have the chelating agent chelate the iron of the iron compound;

reacting the chelated iron with the peroxide to catalytically convert the peroxide to an oxidizing agent;

contacting the mass of the contaminant with the buffering agent to adjust the pH to between 7.0 and 9.0; and contacting the contaminant with the oxidizing agent to oxidize the contaminant.

24. The method as recited in claim 23 wherein the contaminant comprises coal tar.

25. The method as recited in claim 23 wherein the contaminant comprises a heavy hydrocarbon.

26. The method as recited in claim 23 wherein the contaminant includes a component that is selected from the group consisting of an aliphatic hydrocarbon, gasoline, diesel fuel, an olefinic hydrocarbon, a chlorinated hydrocarbon, a polychlorinated hydrocarbon, a dry cleaning solvent, an industrial solvents, a wood-treating agent, a herbicide, a pesticide, a polychlorinated biphenyl, an aromatic hydrocarbon, a polynucleararomatic hydrocarbon, an oxygenated hydrocarbon, a phenol, a phenol derivative, and a nitrogenous hydrocarbon.

27. The method as recited in claim 23 wherein the organic sediment is substantially un-oxidized by the oxidizing agent.

28. The method as recited in claim 23 wherein the oxidizing agent has an oxidizing potential that is high enough to oxidize the contaminant, but not high enough to substantially oxidize the organic sediment.

* * * * *